United States Patent
Watanabe

(10) Patent No.: US 11,860,604 B2
(45) Date of Patent: Jan. 2, 2024

(54) ANALYSIS ASSISTANCE APPARATUS, ANALYSIS ASSISTANCE METHOD, AND COMPUTER-READABLE RECORDING MEDIUM

(71) Applicant: NEC Corporation, Tokyo (JP)

(72) Inventor: Masafumi Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 531 days.

(21) Appl. No.: 17/261,410

(22) PCT Filed: Jul. 26, 2018

(86) PCT No.: PCT/JP2018/028148
§ 371 (c)(1),
(2) Date: Jan. 19, 2021

(87) PCT Pub. No.: WO2020/021686
PCT Pub. Date: Jan. 30, 2020

(65) Prior Publication Data
US 2021/0263496 A1    Aug. 26, 2021

(51) Int. Cl.
G05B 23/02    (2006.01)
G05B 19/406    (2006.01)

(52) U.S. Cl.
CPC ....... *G05B 19/406* (2013.01); *G05B 23/0216* (2013.01); *G05B 2219/50193* (2013.01)

(58) Field of Classification Search
CPC .............. G05B 19/406; G05B 23/0216; G05B 2219/50193
See application file for complete search history.

(56) References Cited

U.S. PATENT DOCUMENTS

| | | | |
|---|---|---|---|
| 2007/0107057 A1 | 5/2007 | Chander et al. | |
| 2009/0113248 A1 | 4/2009 | Bock et al. | |
| 2018/0004181 A1 | 1/2018 | Ueda et al. | |
| 2018/0224831 A1* | 8/2018 | Liu | G05B 23/0232 |
| 2018/0348728 A1* | 12/2018 | Ota | G06F 17/15 |

FOREIGN PATENT DOCUMENTS

| | | |
|---|---|---|
| JP | 2009-521737 A | 6/2009 |
| JP | 2010-237855 A | 10/2010 |
| JP | 2018-005453 A | 1/2018 |

OTHER PUBLICATIONS

English translation of Written opinion for PCT Application No. JP2018/028148, dated Oct. 9, 2018.
International Search Report for PCT Application No. PCT/JP2018/028148, dated Oct. 9, 2018.

* cited by examiner

*Primary Examiner* — Michael W Choi

(57) ABSTRACT

An analysis assistance apparatus 10 includes: a control program obtainment unit 11 that obtains a control program of a plant based on sensor data from a sensor installed in the plant; an event information obtainment unit 12 that obtains event information, which includes a variable that defines a state of the plant when a predetermined event has occurred and a value thereof, as information necessary for searching the control program for a safety barrier for avoiding the occurrence of the predetermined event in the plant; and a safety barrier search unit 13 that extracts, from the control program, a causal relationship between an input variable and an output variable, and searches the control program for the safety barrier based on the variable and the value included in the event information and on the extracted causal relationship.

9 Claims, 10 Drawing Sheets

Fig.5

CONTROL PROGRAM (PLC1)

```
// Input
LIT101.L2 := D_IN_CH0;
LIT101.L  := D_IN_CH1;
LIT101.H  := D_IN_CH2;
LIT101.H2 := D_IN_CH3;

// Pump control
IF LIT101.L=0 AND LIT101.H=1 THEN
    PMP101.ON := 0;
ELSE_IF  LIT101.L=1  AND  LIT101.H=0
THEN
    PMP101.ON := 1;
END_IF;

PLANT_SD := PLANT_STOP OR LIT101.H2;

// Emergency shutdown
IF PLANT_SD=1 THEN
    PMP101.ON := 0;
END_IF;

// Output
D_OUT_CH0 := PMP101.ON;
```

Fig.6

| D_OUT_CH0, | LIT101.H, | LIT101.H2, | PLANT_STOP | -> | D_OUT_CH0 |
|---|---|---|---|---|---|
| 1, | 0, | 0, | 0 | -> | 1 |
| 1, | (1), | *, | * | -> | 0 |
| 1, | *, | (1), | * | -> | 0 |
| 1, | (1), | *, | * | -> | 0 |
| 1, | *, | *, | (1) | -> | 0 |
| 1, | *, | *, | (1) | -> | 0 |
| 1, | *, | *, | (1) | -> | 0 |
| 1, | *, | *, | (1) | -> | 0 |

INPUT VARIABLE — OUTPUT VARIABLE

ANALYSIS ASSISTANCE APPARATUS, ANALYSIS ASSISTANCE METHOD, AND COMPUTER-READABLE RECORDING MEDIUM

This application is a National Stage Entry of PCT/JP2018/028148 filed on Jul. 26, 2018, the contents of all of which are incorporated herein by reference, in their entirety.

TECHNICAL FIELD

The present invention relates to an analysis assistance apparatus and an analysis assistance method for assisting the analysis on the safety of a plant, and further relates to a computer-readable recording medium in which a program for executing these apparatus and method is recorded.

BACKGROUND ART

Conventionally, a control system for controlling a plant is necessary in factories, power stations, electrical substations, water treatment facilities, and the like. Such a control system generally includes, for example, a PLC (Programmable Logic Controller), an engineering workstation (administration apparatus) that administers and maintains the PLC, and a terminal apparatus that provides an HMI (Human Machine Interface) to an operator.

Among these, the PLC activates an actuator and the like based on sensor data from sensors installed in respective parts of equipment. The PLC operates in accordance with a control program provided from the engineering workstation. Furthermore, as the HMI displays the values of sensor data, the activated state of the actuator, and so forth, the operator can monitor the operation status of equipment via the HMI.

In a plant, there are a variety of hazard sources (hazards), such as machine tools, fuels, electricity, water, and chemical substances; when they are inappropriately controlled or handled, there is a risk that human lives, equipment, and the like be damaged. To prevent the occurrence of such damage, a variety of safety barriers are provided in a plant based on a design.

Examples of physical safety barriers include a fence that is installed so as not to let workers enter a section in which high-voltage current flows, for instance. Furthermore, safety barriers are not limited to being physical, and may be functional. Examples of functional safety barriers include a safety barrier that is actuated by the execution of a control program by the PLC. Specifically, as a safety barrier, the PLC monitors signals of a water level sensor installed in a water reservoir tank, and when the water level has reached an upper limit of the water reservoir tank, executes a control program that transmits a signal for closing a valve (an actuator) that supplies water to the water reservoir tank.

Furthermore, in a plant that includes such a control system, a technician performs fault tree analysis in advance for quantitative evaluation of a risk. The fault tree analysis is performed by constructing a tree structure in which a specific, undesired event is set as a root node, and events that cause the occurrence of this undesired event are set as intermediate nodes or leaves (e.g., see Patent Document 1).

Specifically, the technician first defines an undesired event in a plant, which serves as an origin point. Next, the technician extracts every logical combination of events that cause the occurrence of the defined event by analyzing design information of the plant, and constructs a fault tree by setting the extracted events as nodes. By performing such fault tree analysis in advance, the technician can quickly address a failure in the plant, even if such a failure has occurred.

LIST OF RELATED ART DOCUMENTS

Patent Document

Patent Document 1: Japanese Patent Laid-Open Publication No. 2010-237855

SUMMARY OF INVENTION

Problems to be Solved by the Invention

Meanwhile, the technician's extraction of every event that causes the occurrence of the defined event by analyzing the program code of the PLC, which is one of the design information of the plant, is a task that requires an enormous amount of time and effort. Furthermore, even when fault tree analysis was performed in the past, if improvements, modifications, and the like are made to a program of the PLC, there is a possibility that inconsistency is created between the generated fault tree and the logic of the current program. In this case, the technician needs to confirm whether there is inconsistency by analyzing the program code of the PLC again. This task, too, is a task that requires an enormous amount of time and effort.

An example object of the present invention is to provide an analysis assistance apparatus, an analysis assistance method, and a computer-readable recording medium that can solve the aforementioned problems and assist the analysis of a control program in a case where the safety of a plant is assessed.

Means for Solving the Problems

To achieve the aforementioned example object, an analysis assistance apparatus according to an example aspect of the present invention includes: a control program obtainment unit that obtains a control program for controlling respective parts of a plant based on sensor data from a sensor installed in the plant; an event information obtainment unit that obtains event information as information necessary for searching the control program for a safety barrier for avoiding an occurrence of a predetermined event in the plant, the event information including a variable that defines a state of the plant when the predetermined event has occurred and a value thereof; and a safety barrier search unit that extracts, from the obtained control program, a causal relationship between an input variable and an output variable in the control program, and searches the control program for the safety barrier based on the variable and the value included in the obtained event information and on the extracted causal relationship.

Furthermore, to achieve the aforementioned example object, an analysis assistance method according to an example aspect of the present invention includes: (a) a step of obtaining a control program for controlling respective parts of a plant based on sensor data from a sensor installed in the plant; (b) a step of obtaining event information as information necessary for searching the control program for a safety barrier for avoiding an occurrence of a predetermined event in the plant, the event information including a variable that defines a state of the plant when the predetermined event has occurred and a value thereof; and (c) a step of extracting, from the obtained control program, a causal relationship between an input variable and an output variable in the control program, and searching the control program for the safety barrier based on the variable and the value included in the obtained event information and on the extracted causal relationship.

Moreover, to achieve the aforementioned example object, a computer-readable recording medium according to an example aspect of the present invention has recorded therein a program including an instruction that causes a computer to execute: (a) a step of obtaining a control program for controlling respective parts of a plant based on sensor data from a sensor installed in the plant; (b) a step of obtaining event information as information necessary for searching the control program for a safety barrier for avoiding an occurrence of a predetermined event in the plant, the event information including a variable that defines a state of the plant when the predetermined event has occurred and a value thereof; and (c) a step of extracting, from the obtained control program, a causal relationship between an input variable and an output variable in the control program, and searching the control program for the safety barrier based on the variable and the value included in the obtained event information and on the extracted causal relationship.

Advantageous Effects of the Invention

As described above, according to the present invention, the analysis of a control program can be assisted in a case where the safety of a plant is assessed.

BRIEF DESCRIPTION OF THE DRAWINGS

FIG. 5 shows an example of a control program used in the example embodiment of the present invention.

FIG. 6 is a diagram showing examples of causal relationships extracted in the example embodiment of the present invention.

EXAMPLE EMBODIMENT

Example Embodiment

The following describes an analysis assistance apparatus, an analysis assistance method, and a program according to an example embodiment of the present invention with reference to FIG. 1 to FIG. 10.

Apparatus Configuration

Figure 1:
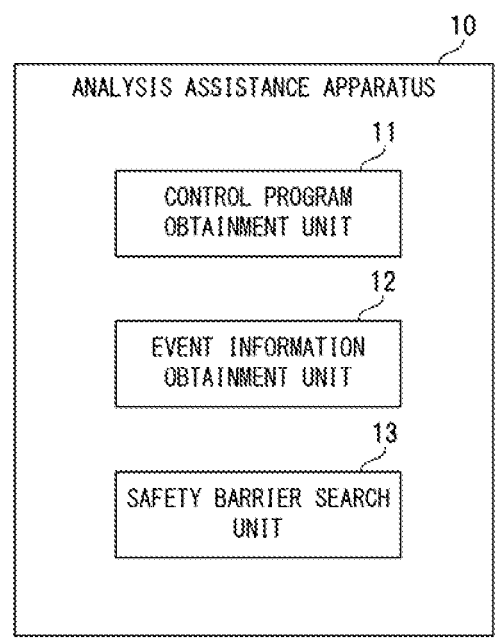
FIG. 1 is a block diagram showing a schematic configuration of an analysis assistance apparatus according to an example embodiment of the present invention.

First, a schematic configuration of the analysis assistance apparatus according to the present example embodiment will be described using FIG. 1. FIG. 1 is a block diagram showing a schematic configuration of the analysis assistance apparatus according to an example embodiment of the present invention.

An analysis assistance apparatus 10 according to the present example embodiment shown in FIG. 1 is an apparatus for assisting the analysis on a control program for controlling respective parts of a plant. As shown in FIG. 1, the analysis assistance apparatus 10 includes a control program obtainment unit 11, an event information obtainment unit 12, and a safety barrier search unit 13.

The control program obtainment unit 11 obtains a control program for controlling respective parts of the plant based on sensor data from a sensor installed in the plant. The event information obtainment unit 12 obtains event information, which includes a variable that defines a state of the plant when a predetermined event has occurred and a value thereof, as information necessary for searching the control program for a safety barrier for avoiding the occurrence of the predetermined event in the plant.

The safety barrier search unit 13 first extracts, from the control program obtained by the control program obtainment unit 11, a causal relationship between an input variable and an output variable of the control program. Then, the safety barrier search unit 13 searches the control program for a safety barrier based on the variable and the value thereof included in the event information obtained by the event information obtainment unit 12, and on the extracted causal relationships.

As described above, the analysis assistance apparatus 10 according to the present example embodiment can automatically extract a safety barrier from the control program. Therefore, according to the analysis assistance apparatus 10, the analysis on the control program can be assisted in a case where the safety of the plant is assessed.

Figure 2:
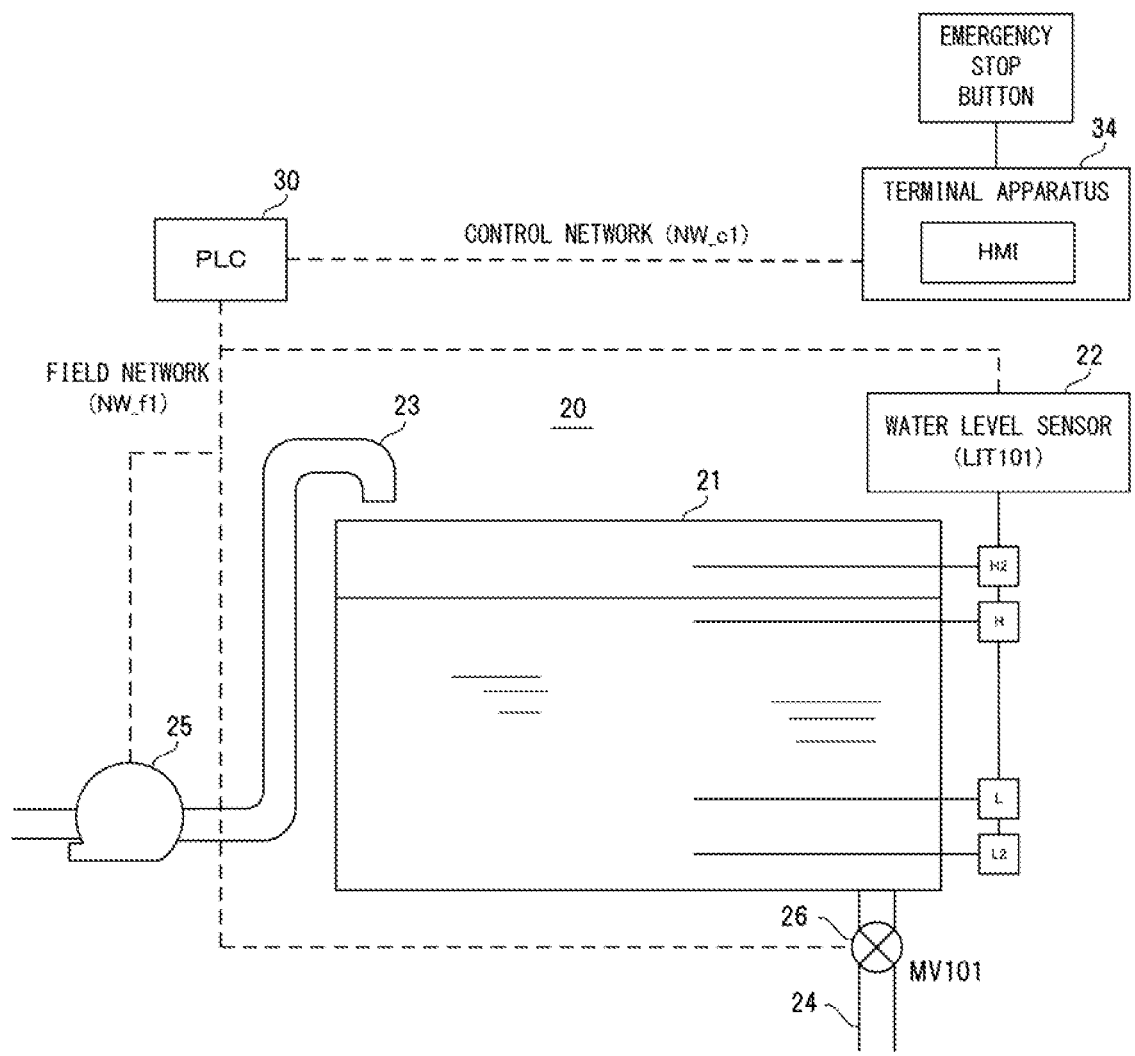
FIG. 2 is a configuration diagram showing an example of a configuration of a plant in which the analysis is to be assisted in the example embodiment of the present invention.
Figure 3:
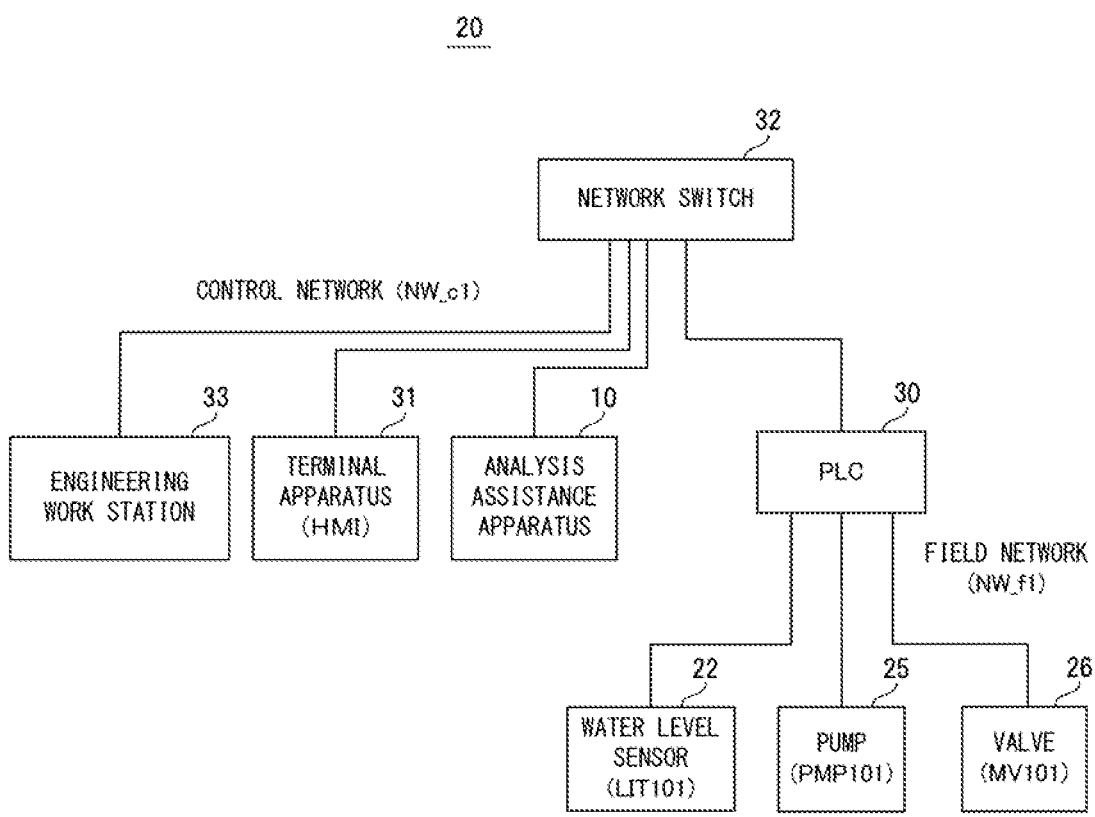
FIG. 3 is a block diagram showing a relationship between the analysis assistance apparatus and a control system of the plant shown in FIG. 2 in the example embodiment of the present invention.
Figure 4:
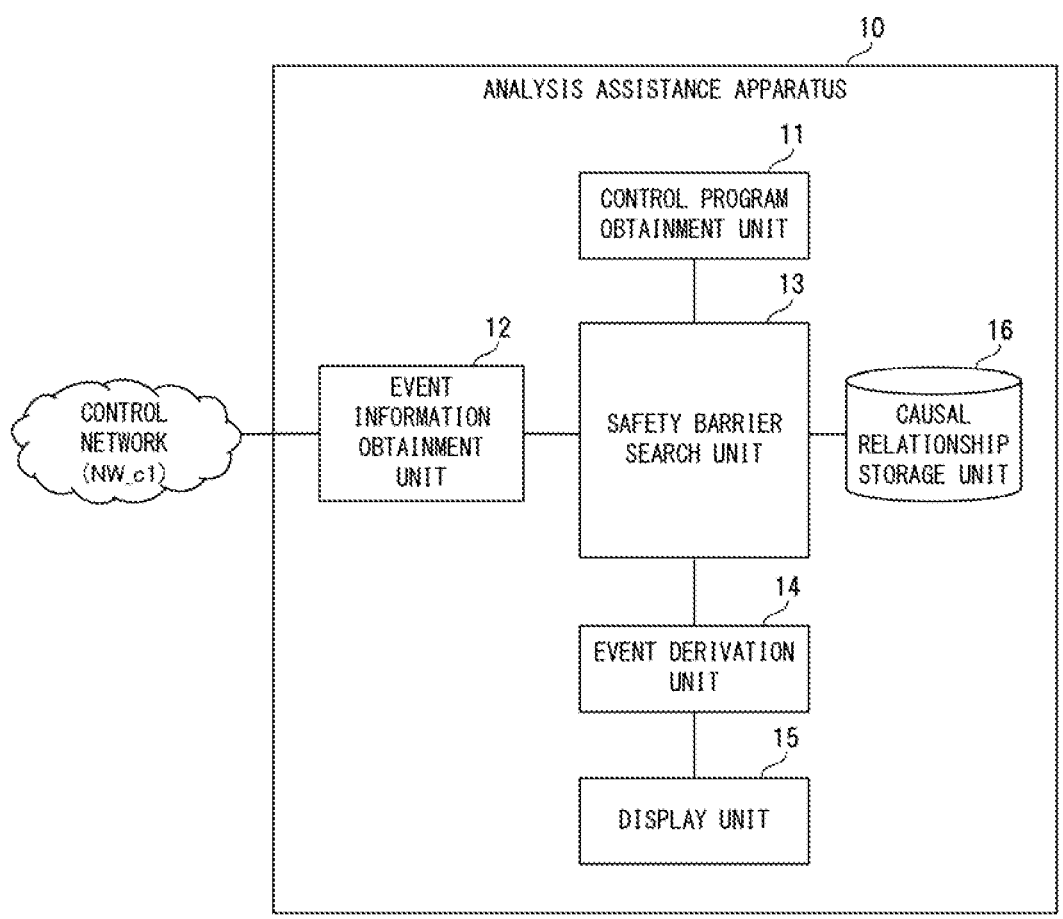
FIG. 4 is a block diagram showing the configuration of the analysis assistance apparatus according to the example embodiment of the present invention in a more specific manner.

Next, the specifics of the configuration and functions of the analysis assistance apparatus according to the present example embodiment will be described using FIG. 2 to FIG. 8. FIG. 2 is a configuration diagram showing an example of a configuration of a plant in which the analysis is to be assisted in the example embodiment of the present invention. FIG. 3 is a block diagram showing a relationship between the analysis assistance apparatus and a control system of the plant shown in FIG. 2 in the example embodiment of the present invention. FIG. 4 is a block diagram showing the configuration of the analysis assistance apparatus according to the example embodiment of the present invention in a more specific manner.

As shown in FIG. 2, in the present example embodiment, a plant 20 includes a water reservoir tank 21, a water level sensor (LIT101) 22, a supply line 23, a water discharge line 24, a pump (PMP101) 25, and a valve (MV101) 26. The plant 20 also includes a PLC (PLC1) 30 that, as a control device, executes a control program.

The water level sensor 22 measures the water level of water reserved in the water reservoir tank 21 in four stages (H2, H, L, L2), and outputs sensor data indicating the measured water level. The supply line 23 is a line for supplying water to the water reservoir tank 21. The pump 25 is mounted on the supply line 23. The water discharge line 24 is a line for discharging water in the water reservoir tank 21. The valve 26 is mounted on the water discharge line 24. The PLC 30 adjusts the water level by placing the pump 25 in operation, or by opening or closing the valve 26, in accordance with sensor data output from the water level sensor 22.

Furthermore, as shown in FIG. 3, in the plant 20, the PLC 30 is connected to an engineering workstation 33 and a terminal apparatus 31 that is used by an operator via a network switch 32 and a control network (NW_c1) in such a manner that data can be communicated. Moreover, the PLC 30 is also connected to the analysis assistance apparatus via the network switch 32 and the control network (NW_c1).

The terminal apparatus 31 provides an HMI to the operator. The operator performs operations on the HMI of the terminal apparatus 31. The engineering workstation 33 administers the operation states of respective PLCs, and also holds control programs thereof. Furthermore, the engineering workstation 33 updates the control programs in accordance with an instruction from, for example, the operator.

In addition, as shown in FIG. 3, the PLC 30 is connected to the water level sensor 22, the pump 25, and the valve 26 via a field network f1 (NW_f1). As described above, the plant 20, which is to be monitored in the present example embodiment, includes the PLC that executes the control program and the networks via which the PLC and other apparatuses are connected.

Furthermore, the configuration of the analysis assistance apparatus 10 according to the present example embodiment will be described in a more specific manner using FIG. 4. As shown in FIG. 4, the analysis assistance apparatus 10 includes an event derivation unit 14, a display unit 15, and a causal relationship storage unit 16 in addition to the control program obtainment unit 11, the event information obtainment unit 12, and the safety barrier search unit 13 shown in FIG. 1.

In the present example embodiment, the control program obtainment unit 11 obtains, from the engineering workstation 33 shown in FIG. 2, a control program held therein. FIG. 5 shows an example of a control program used in the example embodiment of the present invention. Also, the control program shown in FIG. 5 is a part of a control program of the PLC 30. In FIG. 5, each of "LIT101.H2", "LIT101.H", "LIT101.L2", "LIT101.L", and "PMP101.ON" denotes a signal used in the plant 20.

Specifically, "LIT101.H2" is a signal that becomes "High (1)" when the water level is the highest of the four stages, and becomes "Low (0)" otherwise. "LIT101.H" is a signal that becomes "High (1)" when the water level has decreased from the highest water level by one stage, and becomes "Low (0)" otherwise. "LIT101.L" is a signal that becomes "High (1)" when the water level has decreased from the highest water level by two stages, and becomes "Low (0)" otherwise. "LIT101.L2" is a signal that becomes "High (1)" when the water level is the lowest of the four stages, and becomes "Low (0)" otherwise.

Also, in FIG. 5, "D_OUT_CH0" is a signal (flag) that controls the pump 25, and becomes "1" when issuing a driving instruction and "0" when issuing a stopping instruction. Furthermore, "PLANT_SD" is a signal (flag) indicating whether stopping of the entirety of the plant 20 has been requested, and becomes "1" when a shutdown of the entirety of the plant 20 has been requested and "0" otherwise. "PLANT_STOP" is a signal (flag) indicating whether an emergency stop button has been pressed, and becomes "1" when the emergency stop button has been pressed and "0" otherwise.

Note that, a signal which has been received by the PLC 30 from the sensor and the like and which communicates, for example, a state of a manufacturing process is written into a location corresponding to this signal inside a storage device included in this PLC. Also, a signal which has been transmitted by the PLC to the actuator and the like and which, for example, activates or stops the actuator and the like is read out from a location corresponding to this signal inside the storage device included in the PLC. Furthermore, a location inside the storage device is generally referred to as a variable, a tag, a register, and so forth; in the present example embodiment, it is referred to as a variable. In addition, a variable into which a received signal is written is referred to as an input variable, and a variable from which a signal to be transmitted is read out is referred to as an output variable.

In the present example embodiment, the event information obtainment unit 12 obtains event information related to a failure event (e.g., "a failure to stop the pump"). A failure event is an event in which a safety barrier did not function and the occurrence was not able to be deterred. Also, a safety barrier is means for making a transition from a state where a failure event has occurred to a state where the occurrence of the failure event has been avoided, and is specifically a program module implemented in a control program. Furthermore, a safety barrier includes an origin point and an end point of the transition, as well as a transition condition that causes the transition.

In the present example embodiment, the safety barrier search unit 13 first extracts causal relationships from the control program of the PLC 30, and stores the extracted causal relationships into the causal relationship storage unit 16. A causal relationship indicates, for example, the input variables whose values served as the bases for determining the value of an output variable output from each PLC. The safety barrier search unit 13 also stores the extracted causal relationships into the causal relationship storage unit 16.

A description is now given of the specifics of processing in which the safety barrier search unit 13 extracts causal relationships using FIG. 6. FIG. 6 is a diagram showing examples of the causal relationships extracted in the example embodiment of the present invention.

Specifically, as shown in FIG. 6, for each processing step (row) in the control program (see FIG. 5), the safety barrier search unit 13 first specifies an output variable from among respective variables that are read out and written as analysis processing. An output variable is a special variable that is used by the PLC to transmit signals for controlling respective parts of the plant; in many cases, a naming rule describing that the start of a variable name of an output variable be "D_OUT", for example, is separately set. For example, the safety barrier search unit 13 can specify a variable that matches the naming rule of output variables as an output variable.

Subsequently, the safety barrier search unit 13 specifies, from the control program, input variables that can influence the determination of the value of the output variable. Furthermore, when there are other input variables that can influence the determination of the values of the specified input variables, the other input variables are specified as well; for this reason, the safety barrier search unit 13 specifies input variables recursively as long as a new input variable is specified.

Input variables that can influence the determination of the value of a certain output variable can be specified as follows. For example, when the control program includes assignment statements that assign a value to an output variable, the safety barrier search unit 13 specifies, as input variables, other variables that are referred to by the assignment statements as the values to be assigned. Furthermore, when whether to execute the assignment statements in the control program is determined by the result of evaluation of a condition expression in a conditional branch, such as an IF statement, the safety barrier search unit 13 also specifies, as input variables, other variable that are referred to by the condition expression.

Next, the safety barrier search unit 13 searches the control program for assignment statements that assign constants to the input variables, or condition expressions that compare the input variables with constants, determines whether the input variables can take constants from the assignment statements or the condition expressions that were able to be specified through the search, and specifies the constants (values) if the input variables can take the constants.

Then, the safety barrier search unit 13 exhaustively generates a plurality of input value patterns from the input variables that have been specified thus far and from the constants (values) that can be taken by these input variables. Next, for each of the input value pattern, the safety barrier search unit 13 executes the control program once under a state where this input value pattern is given, and obtains an output value. At this time, input variables that were referred to by the control program during the execution are recorded as well.

Then, after the execution of the control program, the safety barrier search unit 13 extracts the recorded input variables and the values thereof, as well as the values of output variables output by the control program, and uses them as causal relationships. The extracted causal relationships are as shown in FIG. 6.

The safety barrier search unit 13 extracts signals included in assignment processing and in branch conditions during conditional branching processing, as well as the values thereof, as causal relationships among a plurality of signals used in the plant. In other words, the safety barrier search unit 13 extracts causal relationships by specifying an output variable, specifying input variables, specifying the values that can be taken by the input variables, generating input value patterns, and obtaining output values as well as input variables that were referred to during the execution of the control program.

Once the causal relationships have been extracted, the safety barrier search unit 13 subsequently generates a state transition graph with use of the variable and the value included in the event information and the extracted causal relationships. The state transition graph indicates state transitions from a state defined by the variable and the value included in the event information, and also includes an origin point and an end point of the transitions, as well as transition conditions that cause the transitions. Then, the safety barrier search unit 13 searches for safety barriers by specifying, from the generated state transition graph, transitions to a state where the occurrence of the failure event has been avoided.

Furthermore, the safety barrier search unit 13 may generate state transition graphs for the entirety of the plant 20 from the causal relationships in advance, and specify, from among the generated state transition graphs for the entirety, a necessary state transition graph with use of the variable and the value included in the event information.

Figure 7:
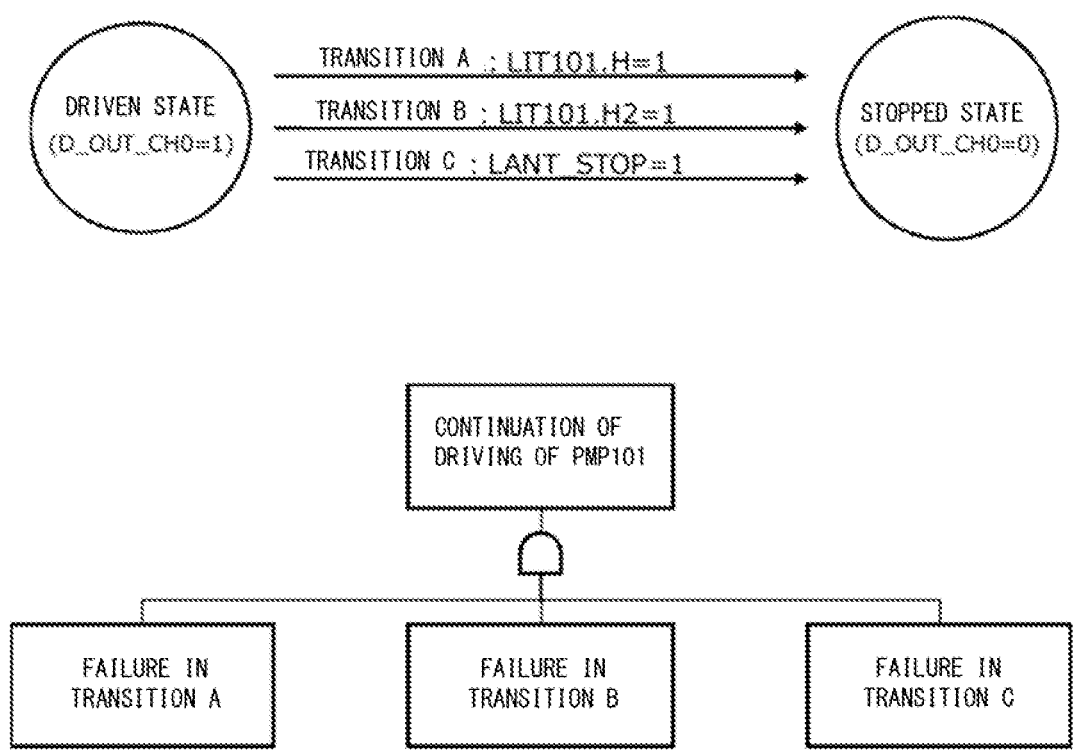
FIG. 7 is a diagram showing examples of a state transition graph and a fault tree generated in the example embodiment of the present invention.
Figure 8:
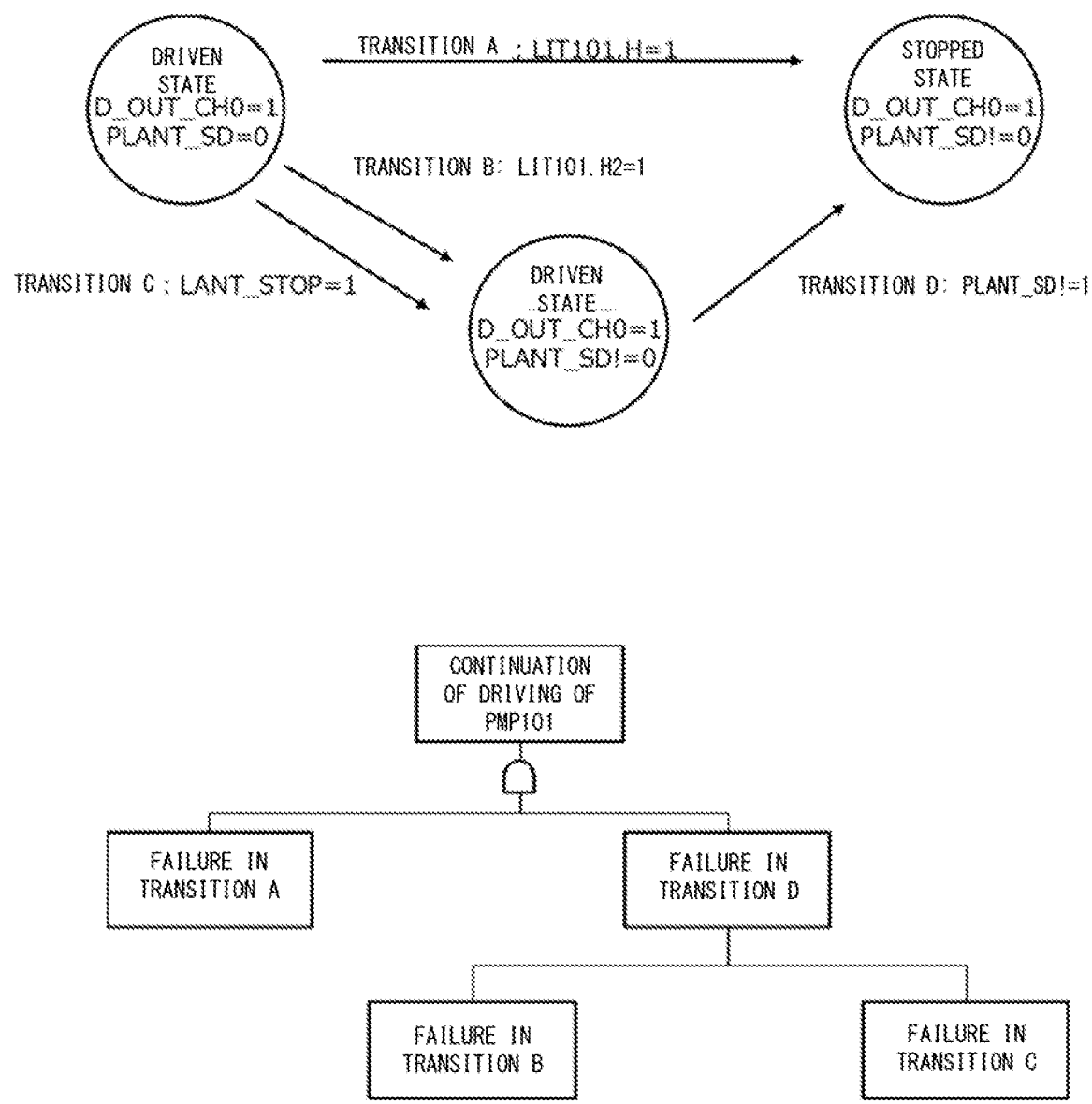
FIG. 8 is a diagram showing other examples of the state transition graph and the fault tree generated in the example embodiment of the present invention.

A description is now given of the specifics of processing in which the safety barrier search unit 13 searches for safety barriers using FIG. 7 and FIG. 8. FIG. 7 is a diagram showing examples of a state transition graph and a fault tree generated in the example embodiment of the present invention. FIG. 8 is a diagram showing other examples of the state transition graph and the fault tree generated in the example embodiment of the present invention. The following description will be provided using an example case where the event information includes a variable (D_OUT_CH0) for controlling the pump 25 and its value "1".

As shown in the upper level of FIG. 7, the safety barrier search unit 13 generates the state transition graph from the variable (D_OUT_CH0) for controlling the pump 25 and the causal relationships shown in FIG. 6. This state transition graph includes two states: "D_OUT_CH0=1" and "D_OUT_CH0=0". It also includes three transitions from the state "D_OUT_CH0=1" to the state "D_OUT_CH0=0".

In other words, in the example of FIG. 7, a state where the failure event occurs is a state where the issuance of an instruction for driving the pump 25 is continued. Therefore, in order to avoid this state, the safety barrier search unit 13 generates the state transition graph that includes transitions from a state where the instruction for driving the pump 25 is issued to a state where a stopping instruction is issued.

Furthermore, the transitions between states in the state transition graph include an origin point, an end point, and transition conditions, which are generated from the causal relationships. The origin point is generated from a variable that is included among input variables in the causal relationships and is also included in the event information, and the value thereof. The end point is generated from a variable that is included among output variables in the causal relationships and is also included in the event information, and the value thereof. The transition conditions are generated from variables that are included among input variables in the causal relationships and are not included in the event information, and the values thereof.

For example, transition A in FIG. 7 is generated from the second and the fourth causal relationships in FIG. 6, and includes an origin point "D_OUT_CH0=1", an end point "D_OUT_CH0=0", and a transition condition "LIT101.H=1". Transition B in FIG. 7 is generated from the third causal relationship in FIG. 6, and includes an origin point "D_OUT_CH0=1", an end point "D_OUT_CH0=0", and a transition condition "LIT101.H2=1". Transition C in FIG. 7 is generated from four causal relationships composed of the fourth to the eighth causal relationships in FIG. 6, and includes an origin point "D_OUT_CH0=1", an end point "D_OUT_CH0=0", and a transition condition "PLANT_STOP=1".

In addition, when there is a causal relationship in which none of values of the variable included in the event information is designated as a value of an input variable, the safety barrier search unit 13 can generate a plurality of transitions with origin points represented by respective states in the state transition graph. Similarly, when there is a causal relationship in which none of values of the variable included in the event information is designated as a value of an output variable, the safety barrier search unit 13 can generate a plurality of transitions with end points represented by respective states in the state transition graph.

For example, when there is a causal relationship in which the value of "D_OUT_CH0" is not designated as an input variable and "0" is designated as the value of "D_OUT_CH0" as an output variable (not shown), the safety barrier search unit 13 can generate a transition from an origin point "D_OUT_CH0=1" to an end point "D_OUT_CH0=0", and a transition from an origin point "D_OUT_CH0=0" to an end point "D_OUT_CH0=0" (in a case where the values that can be taken by these variables are binary numbers 0 and 1).

Then, the safety barrier search unit 13 uses transition A to transition C shown in the upper level of FIG. 7 as safety barriers.

Using information included in the safety barriers extracted by the safety barrier search unit 13, the event derivation unit 14 derives new events in which the safety barriers have a possibility of not functioning, that is to say, new events that cause the occurrence of the failure event (undesired event). As stated earlier, the extracted safety barriers are means that have been implemented in the control program to avoid the occurrence of the failure event (undesired event); therefore, the events in which these safety barriers do not function appropriately, that is to say, the events in which when the actual states of respective parts of the plant satisfy the state of the origin point and transition conditions for the state transitions in the state transition graph, the PLC does not execute processing corresponding to these state transitions, and consequently the states of respective parts of the plant do not change to the state of the end point in the state transition graph, can be the new events that cause the occurrence of the failure event. As these new events compose the fault tree viewed by the operator, the event derivation unit 14 derives the events that are described in a natural language that can be intuitively understood by humans.

The lower level of FIG. 7 shows the new events that have been derived by the event derivation unit 14 from the safety barriers extracted by the safety barrier search unit 13, namely "transition A", "transition B", and "transition C". In the example of the lower level of FIG. 7, the new events are "failure in transition A", "failure in transition B", and "failure in transition C" that cause the occurrence of the failure event, namely "continuation of driving of PMP101".

Furthermore, the event derivation unit 14 may add, to the derived events, a text describing that these events have a possibility of being triggered by a cyberattack. For example, there is a possibility that these events occur as a result of falsification of the control program, or falsification of, for example, input signals that are transferred from the sensor and the like to the PLC in the networks, by a cyberattacker who infiltrated the plant.

Furthermore, as indicated by the upper level of FIG. 8, the safety barrier search unit 13 can also generate a state transition graph that indicates states by combining the value of the variable (D_OUT_CH0) for controlling the pump 25 and the value of a variable (PLANT_SD) that represents a request for a plant shutdown. This state transition graph includes three states: "D_OUT_CH0=1, PLANT_SD=0", "D_OUT_CH0=1, PLANT_SD=1", and "D_OUT_CH0=0, PLANT_SD=*" (where * represents 0 and 1).

Furthermore, in the example of FIG. 8, the safety barrier search unit 13 generates four transitions composed of transition A to transition D based on the causal relationships (not shown) extracted from the control program (see FIG. 5). Transition A includes an origin point "D_OUT_CH0=1, PLANT_SD=0", an end point "D_OUT_CH0=0, PLANT_SD=*", and a transition condition "LIT101.H=1". Transition B includes an origin point "D_OUT_CH0=1, PLANT_SD=0", an end point "D_OUT_CH0=1, PLANT_SD=1", and a transition condition "LIT101.H2=1". Transition C includes an origin point "D_OUT_CH0=1, PLANT_SD=0", an end point "D_OUT_CH0=1, PLANT_SD=1", and a transition condition "PLANT_STOP=1". Transition D includes an origin point "D_OUT_CH0=1, PLANT_SD=1", an end point "D_OUT_CH0=0, PLANT_SD=*", and a transition condition (unconditional)". Thereafter, the safety barrier search unit 13 uses transition A to transition D as safety barriers.

Furthermore, although one PLC 30 is included in the plant 20 in the example of FIG. 2 and FIG. 3 described above, the plant 20 may include a plurality of PLCs and a network via which the PLCs are interconnected, in the present example embodiment.

In this example aspect, the control program obtainment unit 11 obtains control programs respectively for the PLCs. Furthermore, the safety barrier search unit 13 searches for safety barriers from the control programs executed by respective PLCs on a per-PLC basis.

Once the safety barrier search unit 13 has searched for the safety barriers, the display unit 15 transmits information for specifying the safety barriers that have been searched for (referred to as "safety barrier information") to the terminal apparatus 31, and causes the terminal apparatus 31 to display the safety barriers on a screen thereof. The display unit 15 can also display the safety barriers as respective transitions that compose the state transition graph as shown in the upper level of FIG. 7 and the upper level of FIG. 8.

Furthermore, when a new event has been derived by the event derivation unit 14, the display unit 15 also transmits information for specifying this new event to the terminal apparatus 31, and causes the terminal apparatus 31 to display the new event as well on the screen thereof. In this case, too, the display unit 15 can also display the failure event (undesired event) and the derived new event as a partial tree of the fault tree with use of quadrilaterals and straight lines as shown in the lower level of FIG. 7 and the lower level of FIG. 8.

For example, by referring to the state transition graph in the upper level of FIG. 7 and the partial tree of the fault tree in the lower level of FIG. 7 as displayed by the display unit 15, the operator can confirm that the causes of the occurrence of an event in which driving of the pump 25 is abnormally continued include: firstly, an event in which the pump 25 does not stop even though the water level of the water reservoir tank has changed from the highest water level to one stage below (failure in transition A); secondly, an event in which the pump 25 does not stop even through the water level of the water reservoir tank has reached the highest level (failure in transition B); and thirdly, an event in which the pump 25 does not stop even though the operator has pressed the emergency stop button (failure in transition C).

[Apparatus Operations]

Figure 9:
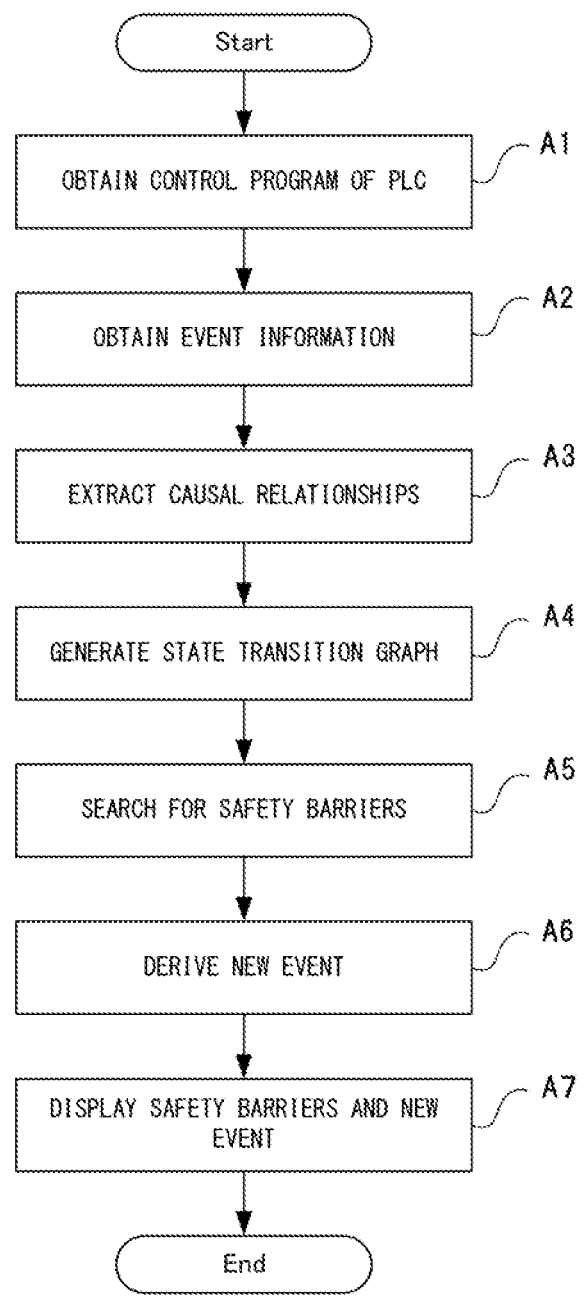
FIG. 9 is a flow diagram showing the operations of the analysis assistance apparatus according to the example embodiment of the present invention.

Next, the operations of the analysis assistance apparatus 10 according to the present example embodiment will be described using FIG. 9. FIG. 9 is a flow diagram showing the operations of the analysis assistance apparatus according to the example embodiment of the present invention. In the following description, FIG. 1 to FIG. 8 will be referred to as appropriate. Furthermore, in the present example embodiment, the analysis assistance method is carried out by causing the analysis assistance apparatus 10 to operate. Therefore, the following description of the operations of the analysis assistance apparatus 10 applies to the analysis assistance method according to the present example embodiment.

As shown in FIG. 9, first, the control program obtainment unit 11 obtains the control program (see FIG. 5) of the PLC 30 of the plant 20 from the engineering workstation 33 (step A1).

Next, the event information obtainment unit 12 obtains event information, which includes a variable that defines a state of the plant when a failure event has occurred and a value thereof, as information necessary for searching the control program for safety barriers for avoiding the occurrence of the failure event in the plant 20 (step A2).

Next, the safety barrier search unit 13 extracts, from the control program of the PLC 30 obtained in step A1, causal relationships between input variables and output variables in the control program (step A3).

Specifically, the safety barrier search unit 13 first specifies, from the control program, input variables that can influence the determination of the value of an output variable. Subsequently, the safety barrier search unit 13 searches the control program for assignment statements that assign constants to the input variables or condition expressions that compare the input variables with constants, and exhaustively generates a plurality of input value patterns from the input variables specified through the search and constants (values) that can be taken by these input variables. Thereafter, for each of the input value patterns, the safety barrier search unit 13 executes the control program once under a state where this input value pattern is given, and obtains an output value; at this time, input variables that were referred to by the control program during the execution are recorded. The causal relationships are represented by the obtained input values and output values.

Next, once the causal relationships have been extracted, the safety barrier search unit 13 generates a state transition graph with use of the variable and the value included in the event information obtained in step A2 and the causal relationships extracted in step A3 (step A4).

Next, the safety barrier search unit 13 searches for safety barriers with use of the state transition graph generated in step A4 (step A5). Specifically, the safety barrier search unit 13 specifies, from the state transition graph, transitions to a state where the occurrence of the failure event has been avoided, and uses the specified transitions as the safety barriers.

Next, the event derivation unit 14 determines whether there is a new event in which the safety barriers that have been searched for in step A5 have a possibility of not functioning; when it is determined that the new event exists, this new event is derived (step A6).

Thereafter, the display unit 15 transmits safety barrier information for specifying the safety barriers that have been searched for in step A5, as well as information for specifying the new event derived in step A6, to the terminal apparatus 31, and causes the terminal apparatus 31 to display the safety barriers and the new event on the screen thereof (step A7).

As described above, according to the present example embodiment, safety barriers are automatically extracted from the control program of the PLC. Therefore, there is no need for the technician of the plant 20 to analyze the program code of the PLC as in conventional cases, and a burden on the technician is lowered. According to the present example embodiment, the analysis on the control program can be assisted in a case where the safety of the plant is assessed.

[Program]

It is sufficient for the program according to the present example embodiment to be a program that causes a computer to execute steps A1 to A7 shown in FIG. 9. The analysis assistance apparatus and the analysis assistance method according to the present example embodiment can be realized by installing this program in the computer and executing this program. In this case, a processor of the computer functions as the control program obtainment unit 11, the event information obtainment unit 12, the safety barrier search unit 13, the event derivation unit 14, and the display unit 15, and performs processing. Also, the causal relationship storage unit 16 is realized by storing a data file of causal relationships into a storage device, such as a hard disk, included in the computer.

Furthermore, the program according to the present example embodiment may be executed by a computer system constructed with a plurality of computers. In this case, for example, each computer may function as one of the control program obtainment unit 11, the event information obtainment unit 12, the safety barrier search unit 13, the event derivation unit 14, and the display unit 15. Also, the causal relationship storage unit 16 may be constructed on a computer that is different from the computer that executes the program according to the present embodiment.

Figure 10:
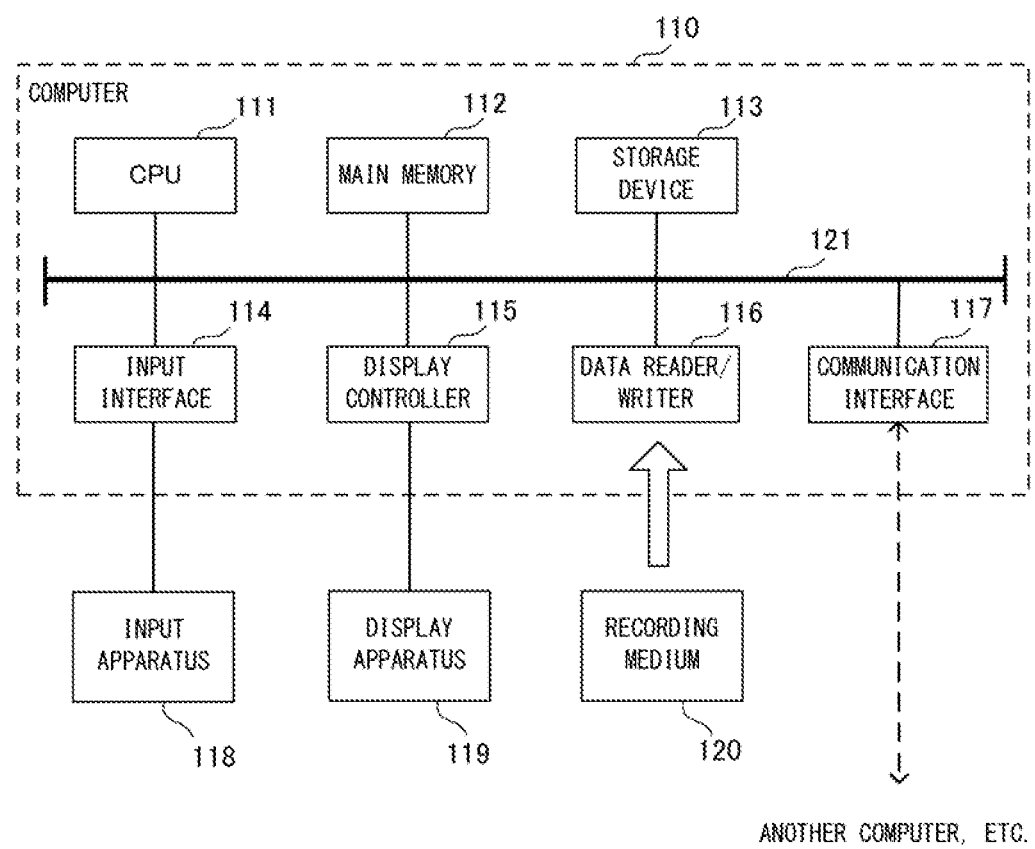
FIG. 10 is a block diagram showing an example of a computer that realizes an analysis assistance apparatus 10 according to the example embodiment of the present invention.

Using FIG. 10, the following describes a computer that realizes the analysis assistance apparatus 10 by executing the program according to the present example embodiment. FIG. is a block diagram showing an example of a computer that realizes the analysis assistance apparatus 10 according to the example embodiment of the present invention.

As shown in FIG. 10, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111, or in place of the CPU 111.

The CPU 111 carries out various types of calculation by deploying the program (codes) according to the present example embodiment stored in the storage device 113 to the main memory 112, and executing the codes in a predetermined order. The main memory 112 is typically a volatile storage device, such as a DRAM (dynamic random-access memory). Also, the program according to the present example embodiment is provided in a state where it is stored in a computer-readable recording medium 120. Note that the program according to the present example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input apparatus 118, such as a keyboard and a mouse. The display controller 115 is connected to a display apparatus 119, and controls display on the display apparatus 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the analysis assistance apparatus 10 according to the present example embodiment can also be realized by using items of hardware that respectively correspond to the components, rather than the computer in which the program is installed. Furthermore, a part of the analysis assistance apparatus 10 may be realized by the program, and the remaining part of the analysis assistance apparatus 10 may be realized by hardware.

A part or an entirety of the above-described example embodiment can be represented by (Supplementary Note 1) to (Supplementary Note 12) described below, but is not limited to the description below.

(Supplementary Note 1)

An analysis assistance apparatus, including:
 a control program obtainment unit configured to obtain a control program for controlling respective parts of a plant based on sensor data from a sensor installed in the plant;
 an event information obtainment unit configured to obtain event information as information necessary for searching the control program for a safety barrier for avoiding an occurrence of a predetermined event in the plant, the event information including a variable that defines a state of the plant when the predetermined event has occurred and a value thereof; and
 a safety barrier search unit configured to extract, from the obtained control program, a causal relationship between an input variable and an output variable in the control program, and search the control program for the safety barrier based on the variable and the value included in the obtained event information and on the extracted causal relationship.

(Supplementary Note 2)

The analysis assistance apparatus according to Supplementary Note 1, further including:
 an event derivation unit configured to derive a new event in which the safety barrier that has been searched for has a possibility of not functioning; and
 a display unit configured to display the specified safety barrier and the derived new event on a screen.

(Supplementary Note 3)

The analysis assistance apparatus according to Supplementary Note 1 or 2, wherein
 the safety barrier search unit
 generates, with use of the variable and the value included in the event information and the extracted causal relationship, a state transition graph which indicates a state transition from the state defined by the variable and the value included in the event information, and which includes an origin point and an end point of the transition and a transition condition that causes the transition, and
 searches for the safety barrier by specifying, from the generated state transition graph, a transition to a state where the occurrence of the predetermined event has been avoided.

(Supplementary Note 4)

The analysis assistance apparatus according to any one of Supplementary Notes 1 to 3, wherein
 in a case where the plant includes a plurality of control devices that execute the control program and a network via which the plurality of control devices are interconnected,
 the control program obtainment unit obtains the control program for each of the control devices, and
 for each of the control devices, the safety barrier search unit searches for the safety barrier from the control program executed by the control device.

(Supplementary Note 5)

An analysis assistance method, including:
 (a) a step of obtaining a control program for controlling respective units of a plant based on sensor data from a sensor installed in the plant;
 (b) a step of obtaining event information as information necessary for searching the control program for a safety barrier for avoiding an occurrence of a predetermined event in the plant, the event information including a variable that defines a state of the plant when the predetermined event has occurred and a value thereof; and
 (c) a step of extracting, from the obtained control program, a causal relationship between an input variable and an output variable in the control program, and searching the control program for the safety barrier based on the variable and the value included in the obtained event information and on the extracted causal relationship.

(Supplementary Note 6)

The analysis assistance method according to Supplementary Note 5, further including:
 (d) a step of deriving a new event in which the safety barrier that has been searched for has a possibility of not functioning; and
 (e) a step of displaying the specified safety barrier and the derived new event on a screen.

(Supplementary Note 7)

The analysis assistance method according to Supplementary Note 5 or 6, wherein
 in the (c) step,
 a state transition graph is generated with use of the variable and the value included in the event information and the extracted causal relationship, the state transition graph indicating a state transition from the state defined by the variable and the value included in the event information, and including an origin point and an end point of the transition and a transition condition that causes the transition, and
 the safety barrier is searched for by specifying, from the generated state transition graph, a transition to a state where the occurrence of the predetermined event has been avoided.

(Supplementary Note 8)

The analysis assistance method according to any one of Supplementary Notes 5 to 7, wherein
 in a case where the plant includes a plurality of control devices that execute the control program and a network via which the plurality of control devices are interconnected,
 in the (a) step, the control program is obtained for each of the control devices, and
 in the (c) step, for each of the control devices, the safety barrier is searched for from the control program executed by the control device.

(Supplementary Note 9)

A computer-readable recording medium in which a program is recorded, the program including an instruction that causes a computer to carry out:
 (a) a step of obtaining a control program for controlling respective parts of a plant based on sensor data from a sensor installed in the plant;

(b) a step of obtaining event information as information necessary for searching the control program for a safety barrier for avoiding an occurrence of a predetermined event in the plant, the event information including a variable that defines a state of the plant when the predetermined event has occurred and a value thereof; and (c) a step of extracting, from the obtained control program, a causal relationship between an input variable and an output variable in the control program, and searching the control program for the safety barrier based on the variable and the value included in the obtained event information and on the extracted causal relationship.

(Supplementary Note 10)

The computer-readable recording medium according to Supplementary Note 9, wherein the program further includes an instruction that causes the computer to carry out:

(d) a step of deriving a new event in which the safety barrier that has been searched for has a possibility of not functioning; and (e) a step of displaying the specified safety barrier and the derived new event on a screen.

(Supplementary Note 11)

The computer-readable recording medium according to Supplementary Note 9 or 10, wherein in the (c) step, a state transition graph is generated with use of the variable and the value included in the event information and the extracted causal relationship, the state transition graph indicating a state transition from the state defined by the variable and the value included in the event information, and including an origin point and an end point of the transition and a transition condition that causes the transition, and the safety barrier is searched for by specifying, from the generated state transition graph, a transition to a state where the occurrence of the predetermined event has been avoided.

(Supplementary Note 12)

The computer-readable recording medium according to any one of Supplementary Notes 9 to 11, wherein in a case where the plant includes a plurality of control devices that execute the control program and a network via which the plurality of control devices are interconnected, in the (a) step, the control program is obtained for each of the control devices, and in the (c) step, for each of the control devices, the safety barrier is searched for from the control program executed by the control device.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

As described above, according to the present invention, the analysis on a control program can be assisted in a case where the safety of a plant is assessed. The present invention is useful for various types of plants that are controlled by a control device.

REFERENCE SIGNS LIST 10 analysis assistance apparatus
11 control program obtainment unit
12 event information obtainment unit
13 safety barrier search unit
14 event derivation unit
15 display unit
16 causal relationship storage unit
20 plant
21 water reservoir tank
22 water level sensor
23 supply line
24 water discharge line
25 pump
26 valve
30 PLC
31 terminal apparatus
32 network switch
33 engineering workstation
110 computer
111 CPU
112 main memory
113 storage device
114 input interface
115 display controller
116 data reader/writer
117 communication interface
118 input apparatus
119 display apparatus
120 recording medium
121 bus

What is claimed is:

1. An analysis assistance apparatus comprising:

a processor; and a memory storing instructions executable by the processor to:

obtain a control program for controlling respective parts of a plant based on sensor data from a sensor installed in the plant;

obtain event information as information necessary for searching the control program for a safety barrier for avoiding an occurrence of a predetermined event in the plant, the event information including a variable that defines a state of the plant when the predetermined event has occurred and a value thereof;

extract, from the obtained control program, a causal relationship between an input variable and an output variable in the control program;

generate, with use of the variable and the value included in the event information and the extracted causal relationship, a state transition graph which indicates a state transition from the state defined by the variable and the value included in the event information, and which includes an origin point and an end point of the transition and a transition condition that causes the transition; and search the control program for the safety barrier based on the variable and the value included in the obtained event information and on the extracted causal relationship, by specifying, from the generated state transition graph, a transition to a state where the occurrence of the predetermined event has been avoided.

2. The analysis assistance apparatus according to claim 1, wherein the instructions are executable by the processor to further:
- derive a new event in which the safety barrier that has been searched for has a possibility of not functioning; and
- display the specified safety barrier and the derived new event on a screen.

3. The analysis assistance apparatus according to claim 1, wherein
- in a case where the plant includes a plurality of control devices that execute the control program and a network via which the plurality of control devices are interconnected,
- the control program is obtained for each of the control devices, and
- the safety barrier is searched for from the control program executed by each of the control devices.

4. An analysis assistance method comprising:
- obtaining, by a processor, a control program for controlling respective parts of a plant based on sensor data from a sensor installed in the plant;
- obtaining, by the processor, event information as information necessary for searching the control program for a safety barrier for avoiding an occurrence of a predetermined event in the plant, the event information including a variable that defines a state of the plant when the predetermined event has occurred and a value thereof;
- extracting, by the processor and from the obtained control program, a causal relationship between an input variable and an output variable in the control program;
- generating, by the processor and with use of the variable and the value included in the event information and the extracted causal relationship, a state transition graph which indicates a state transition from the state defined by the variable and the value included in the event information, and which includes an origin point and an end point of the transition and a transition condition that causes the transition; and
- searching, by the processor, the control program for the safety barrier based on the variable and the value included in the obtained event information and on the extracted causal relationship, by specifying, from the generated state transition graph, a transition to a state where the occurrence of the predetermined event has been avoided.

5. The analysis assistance method according to claim 4, further comprising:
- deriving, by the processor, a new event in which the safety barrier that has been searched for has a possibility of not functioning; and
- displaying, by the processor, the specified safety barrier and the derived new event on a screen.

6. The analysis assistance method according to claim 5, wherein
- in a case where the plant includes a plurality of control devices that execute the control program and a network via which the plurality of control devices are interconnected,
- the control program is obtained for each of the control devices, and
- the safety barrier is searched for from the control program executed by each of the control devices.

7. A non-transitory computer-readable recording medium storing a program executable by a computer to carry out:
- obtaining a control program for controlling respective parts of a plant based on sensor data from a sensor installed in the plant;
- obtaining event information as information necessary for searching the control program for a safety barrier for avoiding an occurrence of a predetermined event in the plant, the event information including a variable that defines a state of the plant when the predetermined event has occurred and a value thereof;
- extracting, by the processor and from the obtained control program, a causal relationship between an input variable and an output variable in the control program;
- generating, with use of the variable and the value included in the event information and the extracted causal relationship, a state transition graph which indicates a state transition from the state defined by the variable and the value included in the event information, and which includes an origin point and an end point of the transition and a transition condition that causes the transition; and
- searching the control program for the safety barrier based on the variable and the value included in the obtained event information and on the extracted causal relationship, by specifying, from the generated state transition graph, a transition to a state where the occurrence of the predetermined event has been avoided.

8. The non-transitory computer-readable recording medium according to claim 7, wherein
- the program is executable by the computer to further carry out:
- deriving a new event in which the safety barrier that has been searched for has a possibility of not functioning; and
- displaying the specified safety barrier and the derived new event on a screen.

9. The non-transitory computer-readable recording medium according to claim 7, wherein
- in a case where the plant includes a plurality of control devices that execute the control program and a network via which the plurality of control devices are interconnected,
- the control program is obtained for each of the control devices, and
- the safety barrier is searched for from the control program executed by each of the control devices.

* * * * *